US007328408B2

(12) United States Patent
Umeki et al.

(10) Patent No.: US 7,328,408 B2
(45) Date of Patent: Feb. 5, 2008

(54) APPARATUS AND METHOD FOR EXTRACTING AND SHARING INFORMATION

(75) Inventors: Hideo Umeki, Kanagawa-ken (JP); Mika Fukui, Tokyo (JP); Kazuyuki Gotoh, Kanagawa-ken (JP); Takehiko Yokota, Tokyo (JP); Sougo Tsuboi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 741 days.

(21) Appl. No.: 10/384,603

(22) Filed: Mar. 11, 2003

(65) Prior Publication Data

US 2003/0177192 A1 Sep. 18, 2003

(30) Foreign Application Priority Data

Mar. 14, 2002 (JP) .............................. 2002-069524

(51) Int. Cl.
*G06F 3/00* (2006.01)

(52) U.S. Cl. ...................................... 715/751
(58) Field of Classification Search ................ 715/751, 715/753, 758

See application file for complete search history.

(56) References Cited

U.S. PATENT DOCUMENTS

| | | | |
|---|---|---|---|
| 6,275,809 B1 * | 8/2001 | Tamaki et al. .................. | 705/8 |
| 6,285,998 B1 * | 9/2001 | Black et al. .................... | 707/4 |
| 6,571,234 B1 * | 5/2003 | Knight et al. .................. | 707/3 |

FOREIGN PATENT DOCUMENTS

| | | |
|---|---|---|
| JP | 7-200427 | 8/1995 |
| JP | 9-269940 | 10/1997 |
| JP | 10-063677 | 3/1998 |
| JP | 11-25099 | 1/1999 |
| JP | 2000-215213 | 8/2000 |
| JP | 2001-053785 | 2/2001 |
| JP | 2002-140344 | 5/2002 |

OTHER PUBLICATIONS

Y. Nomura, et al., IPSJ Journal, vol. 42, No. 10, pp. 2518-2525, "MHC—Message Harmonized Calendaring System", Jan. 2001 (with partial English translation).

T. Hasegawa, et al., NTT Cyber Space Laboratories, vol. 40, No. 10, pp. 3694-3705, "Extraction of Schedules and To-Do Items from E-mail Messages by Identifying Message Structures and Using Language Expressions", Oct. 1999 (with partial English translation).

* cited by examiner

*Primary Examiner*—Kristine Kincaid
*Assistant Examiner*—Thanh Vu
(74) *Attorney, Agent, or Firm*—Oblon, Spivak, McClelland, Maier & Neustadt, P.C.

(57) ABSTRACT

A message exchange unit receives and distributes a message in a community in which a plurality of users participates. A message memory stores the message received by the message exchange unit. An extraction rule memory stores an extraction rule applicable for the message. The extraction rule includes an extraction pattern, an extraction target and a display format. An information extraction unit extracts information from the message stored in the message memory by referring to the extraction rule. An extraction result memory stores extraction result information by the information extraction unit. An extraction result editing unit edits the extraction result information stored in the extraction result memory. A message generation unit generates another message representing editing of the extraction result information.

23 Claims, 27 Drawing Sheets

USER DATA

| ID | ACCOUNT NAME | USER NAME | MAIL ADDRESS | PASSWORD |
|---|---|---|---|---|
| u1 | yamada | Taro Yamada | yamada @ toshi.co.jp | ×××× |
| u2 | tanaka | Ichiro Tanaka | tanaka @ yaho.com | ××××× |

FIG.3A

COMMUNITY DATA

| ID | NAME | ACCOUNT NAME | TYPE | OPERATION TIME |
|---|---|---|---|---|
| C3 | BUSINESS COMMUNITY | sales | MEMBER SYSTEM | 2001/12/04 16:32 |

FIG.3B

BELONGING RELATION DATA

| USER ID | COMMUNITY ID | DISTRIBUTION METHOD |
|---|---|---|
| u1 | C3 | ALL ITEMS BY MAIL |
| u2 | C3 | EXTRACTION RESULT BY MAIL |

FIG.3C

MESSAGE DATA

| ID | TITLE | PARENT ID | COMMUNITY ID | CREATOR ID | CREATION TIME |
|---|---|---|---|---|---|
| a4 | MEETING OF THE OTHER DAY | a3 | c2 | u4 | 2002/02/01 12:34 |

FIG.3D

EXTRACTION RULE DATA

| ID | CREATOR ID | NAME | COMMUNITY ID | LAST UPDATE TIME | LATEST APPLICATION TIME |
|---|---|---|---|---|---|
| r1 | u1 | LINK COLLECTION | c3 | 2001/12/04 18:14 | 2001/12/07 11:32 |

FIG.4A

APPLICATION RELATION DATA OF EXTRACTION RULE

| EXTRACTION RULE ID | MESSAGE ID |
|---|---|
| r1 | a5 |
| r1 | a3 |

FIG.4B

| COMMUNITY LIST | BUSINESS COMMUNITY | MY SPACE |
|---|---|---|

HOME

▶BULLETIN BOARD

INFORMATION EXTRACTION

SCREEN FOR CREATION A REPLAY ~1901

From : Kimura <Kimura @ toshi-s.com>

Subject: Re : MONTHLY REPORT MEETING ~1902

I am Kimura.

I wrote the minutes of previous meeting.

THE MINUTES OF MONTHRY REPORT MEETING (2002/01/24)

PLACE : A CONFERENCE ROOM

ATTENDANCE : Yamada, Tanaka, Nakamura, Kimura

CONTENTS : - - - - -

~1903

[V] NEW EXTRACTION BASED ON THIS ARTICLE ——1904

(SEND) ~1905    (CANCEL) ~1906

FIG.8

| COMMUNITY LIST | BUSINESS COMMUNITY | MY SPACE |

HOME
BULLETIN BOARD
▶INFORMATION EXTRACTION

LIST OF INFORMATION EXTRACTION (EDITING) 1500

NEW CREATION [DATE INFORMATION ▼]

1202

[V] BUSINESS SCHEDULE  02/01/15 UPDATE!

[ ] PERSON IN CHARGE OF BUSINESS  01/12/26

1502

[ ] QUESTIONS AND ANSWERS  02/01/08

[ ] COLLECTION OF LINKS  02/01/14 UPDATE!

1503  1504  1505  1506  1507
(UP) (DOWN) (COPY) (PUT) (DELETION)

(UNIFY)～1508

| DATE INFORMATION ▼ |
| COLLECTION OF LINKS |
| COLLECTION OF QUESTIONS AND ANSWERS |
| THE MINUTES |
| CALL |

```xml
<?xml version="1.0"?>
<ruleset id="r1" title="Business schedule" author="u4" />

<extraction>
 <target community="u1"/>
 <rule class="Schedule"/>
 <pattern>
  Date : ${Schedule/date},${Schedule/time}
  Place: ${Schedule/where}
  (Contents |Title| Subject) : ${Schedule/what}
 </pattern>
</extraction>

<style>
 <template name ="itemize" type="2">
  <sort class="Schedule" attribute="date"/>
  <showlist type="Normal">
      Schedule/time,Schedule/what,Schedule/where
   </showlist>
   <showlist type="Link">
      Schedule/message/author
   </showlist>
 </template>
</style>

</ruleset>
```

FIG.13

Date : ${Schedule/date},${Schedule/time}
Place : ${Schedule/where}
(Contents |Title| Subject) : ${Schedule/what}

FIG.14

| COMMUNITY LIST | BUSINESS COMMUNITY | MY SPACE |
|---|---|---|
| HOME | LIST OF INFORMATION EXTRACTION  EXTRACTION RESULT  EXTRACTION RULE (EDITING) — 1601 | |
| BULLETIN BOARD | ID: r1 | |
| ▶ INFORMATION EXTRACTION | TITLE: BUSINESS SCHEDULE | |
| | EXTRACTION PATTERN: DATE INFORMATION  1602 | |
| | EXTRACTION TARGET: BUSINESS COMMUNITY (Sales) | |
| | ALL MESSAGES | |
| | DISPLAY FORMAT: DEFAULT FORMAT | |
| | TYPICAL EXTRACTION PATTERN | |
| | Date : X X X X<br>Place : X X X X<br>(Contents \|Title\| subject) : X X X X  — 1603 | |

FIG.15

Subject : Next meeting

I am Tanaka.

Date : February 10, 2002 — 2401

Contents : Meeting for setting a business target — 2402

I leave it entirely to you.

Kazuo Tanaka
The second business division

Subject : Next meeting

I am Tanaka.

The meeting date is February 10, 2002 — 2411

The subject is a business target of next term. — 2412

I leave it entirely to you.

Kazuo Tanaka
The second business division

```xml
<?xml version="1.0"?>

<extracts rulesetID="r1">

<item type="Schedule" messageID="a55">
      <value name="date">2001/10/05</value>
      <value name="time">14:00~18:00</value>
      <value name="what">Plan meeting</value>
   </item>

<item type="Schedule" messageID="a73">
      <value name="date">2001/11/25</value>
      <value name="what">Reception</value>
   </item>
    ...
<extracts>
```

FIG.19

| COMMUNITY LIST | BUSINESS COMMUNITY | | MY SPACE |
|---|---|---|---|
| HOME<br>BULLETIN BOARD<br>▶INFORMATION EXTRACTION | LIST OF INFORMATION EXTRACTION | EXTRACTION RESULT<br>(EDITING) | EXTRACTION RULE |
| | COLLECTION OF LINKS    02/01/11<br><br>• A matter of ABC software ―― 1401<br>   http://www.toshi.co.jp/download ―― 1402<br>                                  → Yamada<br><br>―― The latest information is<br>   http://www.toshi.co.jp/whatsnew<br>                                  → Tanaka<br><br>• On-line trade<br>   http://www.onlinetrade.co.jp<br>                                  → Kimura | | |

FIG.21

| COMMUNITY LIST | BUSINESS COMMUNITY | MY SPACE |
|---|---|---|
| HOME<br>BULLETIN BOARD<br>▶INFORMATION EXTRACTION<br><br>1802 | LIST OF INFORMATION EXTRACTION   EXTRACTION RESULT   EXTRACTION RULE<br>(EDITING)<br><br>TITLE : BUSINESS SCHEDULE<br><br>Feburuary 12 (Tuesday)   1801<br>☐ 13:00~ Business meeting   C concil room<br>☐ Inspection of the business chief<br><br>Feburuary 15 (Friday)<br>☑ 15:30~17:00   A contract with Kawasaki Electric Inc.<br><br>Feburuary 27 (Wednesday)<br>☐ Closing of the business report<br><br>1803   1804   1805<br>(ADDITION) (CHANGE) (DELETION) | |

FIG.23

| COMMUNITY LIST | BUSINESS COMMUNITY | MY SPACE |
|---|---|---|
| HOME  BULLETIN BOARD  ▶INFORMATION EXTRACTION | LIST OF INFORMATION EXTRACTION    EXTRACTION RESULT (EDITING)    EXTRACTION RULE  BUSINESS SCHEDULE      2000  TO THE MESSAGE OF EXTRACTION SOURCE  DATE : [February 15, 2002] ~2001  TIME : [15:00~17:30] ~2002  PLACE : [　　　　　　　] ~2003  CONTENTS :  [A contract with Kawasaki Electric Inc.] ~2004  2005  [V] CREATION OF MESSAGE  (UPDATE)~2006     (CANCEL)~2007 | |

FIG.24

| COMMUNITY LIST | BUSINESS COMMUNITY | MY SPACE |
|---|---|---|
| HOME <br> BULLETIN BOARD <br> ▶INFORMATION EXTRACTION | ☑ NOT POST BY MAIL —2100 <br> ☐ USUAL DISTRIBUTION —2101 <br> ☐ POST BY MAIL TO ALL MEMBERS <br> ⸜2102 <br><br> MESSAGE: ⸝2103 <br><br> ┌──────────────────────────────┐ <br> │ I updated the schedule as follows. │ <br> │ │ <br> └──────────────────────────────┘ <br><br> DATE : February 15, 2002   15:00~17:30 <br> PLACE : A council room at 17th F of the head office building <br> CONTENTS : A contract with Kawasaki Electric Inc. <br> ⸝2104 <br><br> Nakamura wrote (in summary) <br> > DATE: February 15, 2002   15:30~17:00 <br> > CONTENTS : A contract with Kawasaki Electric Inc. <br> ──────────────────────────────── <br><br> ( O K )—2105      (RETURN)—2106 | |

FIG.25

```xml
<?xml version="1.0"?>
<extracts rulesetID="r1">

<item type="Schejule" messageID="a55">
        <value name="date">2001/10/05</value>
        <value name="time">14:00~18:00</value>
        <value name="what">Plan meeting</value>
    </item>

<item type="Schejule" messageID="a73">
        <value name="date">2001/11/25</value>
        <value name="what">Reception</value>
    </item>
    ...
</extracts>
```
~2500

```xml
<modify>

<item type="Schejule" messageID="a73">
        mode="replaced" >
        <value name="date">2001/12/03</value>
    </item>

<item type="Schejule" messageID="a55">
        mode="hidden" />

</modify>
```
~2501

FIG.26

Subject: Next meeting ⎯ 2600

I am Nakamura.

I changed the schedule as follows by consulting with Mr.Tanaka.

Mr.Tanaka wrote :
> Date : February 10, 2002 ⎯ 2601

[CHANGE] Date : February 10, 2002, 15:00~17:00 ⎯ 2602

I leave it entirely to you.

Nakamura

FIG.27

APPARATUS AND METHOD FOR EXTRACTING AND SHARING INFORMATION

CROSS-REFERENCE TO RELATED APPLICATIONS

This application is based upon and claims the benefit of priority from the prior Japanese Patent Application P2002-069524, filed on Mar. 14, 2002; the entire contents of which are incorporated herein by reference.

FIELD OF THE INVENTION

The present invention relates to an apparatus and method for extracting and sharing information based on message exchange through an electronic bulletin board or a mail on Internet or Intranet.

BACKGROUND OF THE INVENTION

As a means for mutually exchanging information by a plurality of users, a mailing list using an electronic mail, an electronic bulletin board using WWW (World Wide Web) and a chat, are widely used. In the mailing list, a plurality of electronic mails are collected and collectively sent as a message to all members. In the electronic bulletin board, a space to jointly own information is set on a network, and a plurality of registered users or anonymous users can freely enter a message. In the chat or online chat room, in the same way of the electronic bulletin board, the space to jointly own information is set and a text message can be exchanged in real time.

In a communication means aiming at message exchange of many users such as the mailing list, the electronic bulletin board and the chat, a message related to a topic in which a majority of participants is interested is often exchanged. In this case, a group of users who exchange an electronic message with common purpose or interest is called "a community".

In an information exchange system on the network, if the number of messages to exchange becomes large, a user often misses important information included in the message or it is difficult for the user to understand the contents appeared or discussed over a plurality of messages. Accordingly, a system for extracting predetermined information included in the plurality of messages and for preserving as information resource different from the plurality of messages is proposed.

For example, as a method for extracting schedule data from information of personally received electronic mail based on a rule to extract daily event and for presenting the schedule data, Japanese Patent Disclosure (Kokai) PH9-269940 "Device for Extracting Date or the like", and "Extraction of Schedules and T0-P0 Items from E-mail Messages by Identifying Messages Structures and Using Language Expressions" (A thesis of Information Processing Society, Vol. 40, No. 10, pp. 3694-3705, 1999), are known. Furthermore, as a method for extracting date information from an information source except for the mail and for displaying the date information in a calendar format, Japanese Patent Disclosure (Kokai) P2000-215213 "Method and System for Preparing Table based on Distributed Type Documents" is known. Furthermore, in the community system, as a method for preserving document information corresponding to a plurality of messages in order to manage information apt to be embedded in the message, Japanese Patent Disclosure (Kokai) P2002-140344 "Method and Device for Document Management" is known.

In such a communication system in which a plurality of users exchange and jointly own the message, it is difficult for the user to remember which message includes important information in case of necessary the important information, and the user must repeatedly read a large number of messages in case of information to be often referred. However, in case of jointly owning a simple retrieval result, reutility is scarce because the presentation format is simple and unnecessary information often mixes.

Furthermore, important information exists in the message, in addition to date information such as a meeting program or a schedule, arranged by collecting other's comment or reply for a topic or a question, and arranged by collecting a predetermined expression or format part (such as URL (Uniform Resource Locator) accessible by WWW and mail address) included in the message.

On the other hand, if each user personally arranges the important part included in information such as the mail exchanged by communication among a plurality of users, operation efficiency is bad. In addition to this, an important event (information or status) cannot be jointly owned among the users communicating each other because important information is different for each user. Furthermore, even if collected information is jointly owned by disclosure, it is necessary for the user to check permission of inspection for the collected information or permission of reference for information (such as the mail from which the important item is extracted).

The above-mentioned problem does not occur when each user simply arranges information from personal mails. However, the above-mentioned problem occurs in the community system in which a plurality of users exchanges and jointly owns the message. Accordingly, a system for easily generating an important information extraction rule and an extraction result, and for jointly owning the extraction rule and the extraction result, is necessary.

SUMMARY OF THE INVENTION

It is an object of the present invention to provide an apparatus and method for extracting and sharing information able to easily create the information extraction rule and to jointly own the extraction result information in the community.

According to aspects of the present invention, there is provided an apparatus for extracting and sharing information, comprising: a message exchange unit configured to receive a first message from a user and distribute the first message in a community in which a plurality of users participates; a message memory configured to store the first message received by said message exchange unit; an extraction rule memory configured to store an extraction rule applicable for the first message, the extraction rule including an extraction pattern, an extraction target and a display format; an information extraction unit configured to extract information from the message stored in said message memory by referring to the extraction rule; an extraction result memory configured to store extraction result information by said information extraction unit; an extraction result editing unit configured to edit the extraction result information stored in said extraction result memory; and a message generation unit configured to generate a second or editing message representing editing to the extraction result information.

Further in accordance with another aspect of the present invention, there is also provided a method for extracting and sharing information, comprising: receiving a first message from a user in a community in which a plurality of users participates; storing the first message received in a message memory; extracting information from the first message stored in the message memory by referring to an extraction rule, the extraction rule including an extraction pattern, an extraction target and a display format; storing extraction result information in an extraction result memory; editing the extraction result information stored in the extraction result memory; and generating a second or editing message representing editing of the extraction result information.

Further in accordance with another aspect of the present invention, there is also provided a computer program product, comprising: a computer readable program code embodied in said product for causing a computer to extract and share information, said computer readable program code having: a first program code o receive a first message from a user in a community in which a plurality of users participates; a second program code to store the first message received in a message memory; a third program code to extract information from the first message stored in the message memory by referring to an extraction rule, the extraction rule including an extraction pattern, an extraction target and a display format; a fourth program code to store extraction result information in an extraction result memory; a fifth program code to edit the extraction result information stored in the extraction result memory; and a sixth program code to generate a second or editing message representing editing of the extraction result information.

BRIEF DESCRIPTION OF THE DRAWINGS

FIGS. 3A, 3B, 3C and 3D are schematic diagrams of community management information stored in a community management information memory of FIG. 1.

FIGS. 4A and 4B are schematic diagrams of extraction rule management data stored in the community management information memory of FIG. 1.

FIG. 8 is an example of a message creation screen of the apparatus for extracting and sharing information according to one embodiment of the present invention.

FIG. 9 is an example of an editing screen of an information extraction list of the apparatus for extracting and sharing information according to one embodiment of the present invention.

FIG. 13 is an example of the extraction rule of the apparatus for extracting and sharing information according to one embodiment of the present invention.

FIG. 14 is an example of a standard pattern of date information of the apparatus for extracting and sharing information according to one embodiment of the present invention.

FIG. 15 is an example of an extraction pattern display screen of the extraction rule of the apparatus for extracting and sharing information according to one embodiment of the present invention.

FIGS. 16A and 16B are application examples of the extraction pattern of the apparatus for extracting and sharing information according to one embodiment of the present invention.

FIG. 19 is an example of a data format of the extraction result of the apparatus for extracting and sharing information according to one embodiment of the present invention.

FIG. 21 is another example of the information result display screen of the apparatus for extracting and sharing information according to one embodiment of the present invention.

FIG. 23 is an example of an extraction result editing screen of the apparatus for extracting and sharing information according to one embodiment of the present invention.

FIG. 24 is an example of a change screen of the contents of an extraction result item of the apparatus for extracting and sharing information according to one embodiment of the present invention.

FIG. 25 is an example of a message creation screen of the extraction result editing of the apparatus for extracting and sharing information according to one embodiment of the present invention.

FIG. 26 is an example of the extraction result information with correction information of the apparatus for extracting and sharing information according to one embodiment of the present invention.

FIG. 27 is an example of a reply message including the correction information of the apparatus for extracting and sharing information according to one embodiment of the present invention.

DETAILED DESCRIPTION OF THE INVENTION

Figure 1:
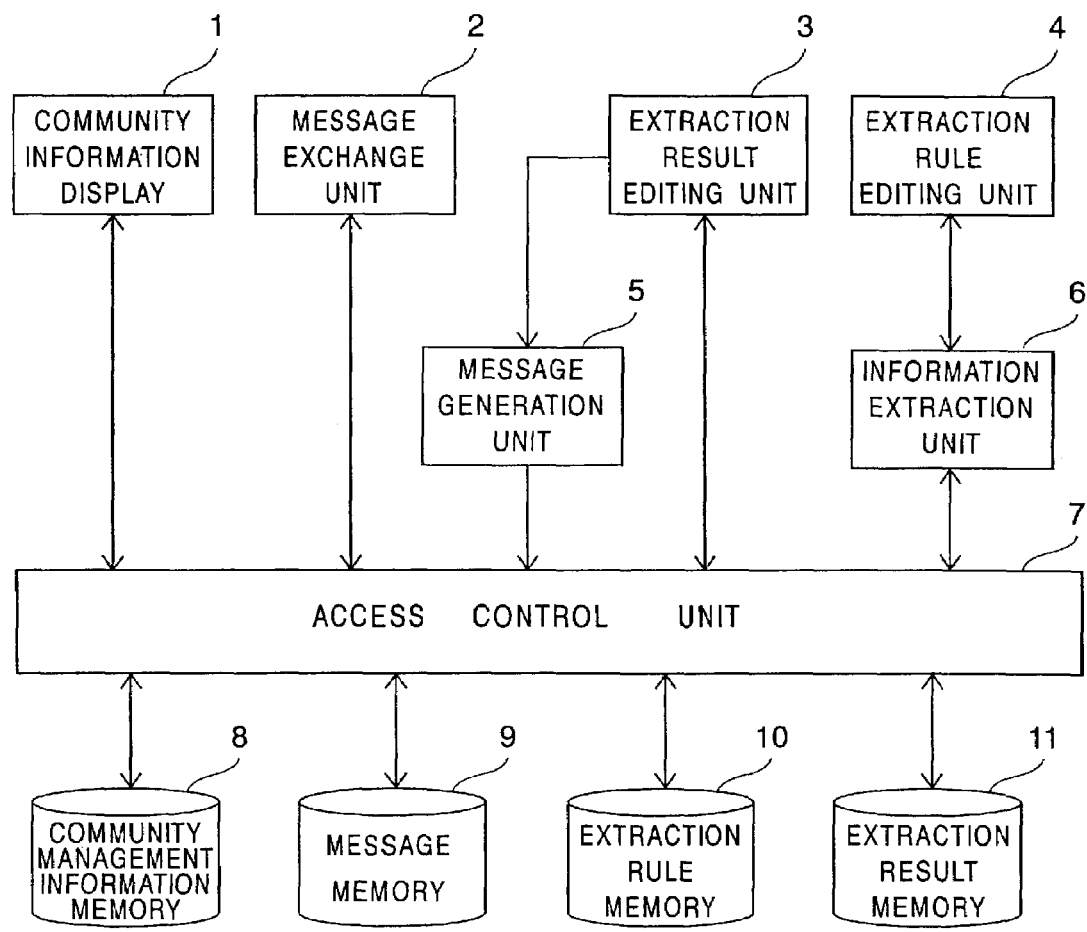
FIG. 1 is a block diagram of the apparatus for extracting and sharing information according to one embodiment of the present invention.

Hereinafter, various embodiments of the present invention will be explained by referring to the drawings.

FIG. 1 is a block diagram of the apparatus for extracting and sharing information according to one embodiment of the present invention. In FIG. 1, a community management information memory 8 stores community management information to manage community of users, such as a community name and member components or users belonging to the community. For example, information that some user belongs to which community is stored as part of the community management information.

An access control unit 7 decides whether new or changed information managed in the community exists by using the community management information, and executes registration, acquirement and change processing of such information.

Message information exchanged in the community is received by a message exchange unit 2 and stored in a message memory 9 through the access control unit 7. Furthermore, the message exchange unit 2 receives a message from each member of the community, registers the message in the message memory 9 and distributes the registered message to each member of the community.

An extraction rule editing unit 4 prepares a means for editing the extraction rule. This editing result is stored in an extraction rule memory 10. The extraction rule includes "an extraction pattern", "an extraction target" and "a display format".

An information extraction unit 6 reads a group of messages as the extraction target from the message memory 9 at predetermined timing, extracts a part matched with the extraction pattern from each message, and stores the extraction result in an extraction result memory 11.

An extraction result editing unit 3 acquires the extraction result indicated by the user from the extraction result memory 11, and executes operation such as addition, correction or deletion for the extraction result. Furthermore, the extraction result editing unit 3 changes the extraction rule based on change of the extraction result or necessity. The modified extraction rule and modified extraction result are respectively stored in the extraction rule memory 10 and the extraction result memory 11.

If new information is added to the extraction result, a message generation unit 5 generates a message (generally referred to as an editing message) including the contents of the new information. This message is also stored in the message memory 9. In this case, it is possible to select whether the message is distributed to each member of the community.

A community information display 1 is a means for displaying information managed by the community under a control of the access control unit 7. Concretely, the community management information, the contents of the message, the extraction rule and the extraction result, are selectively displayed.

Figure 2:
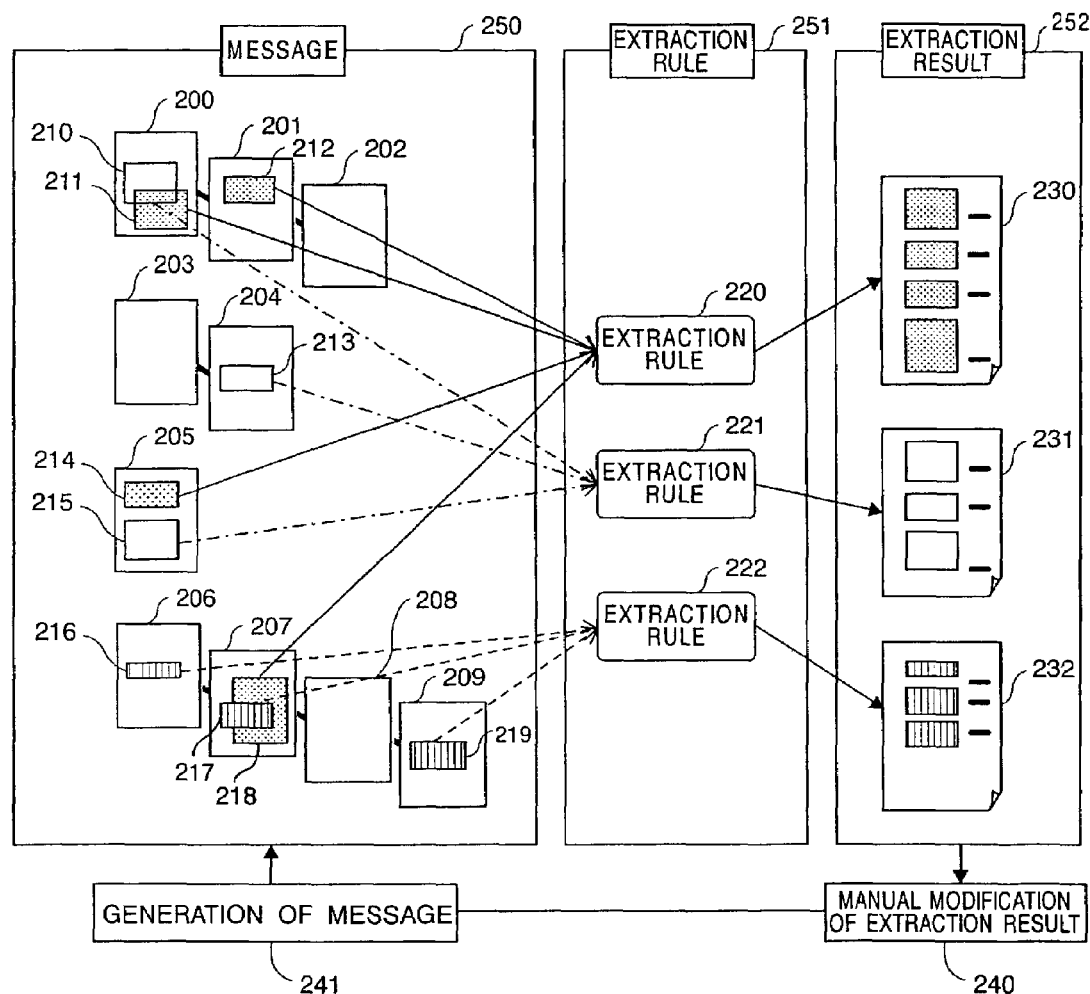
FIG. 2 is a schematic diagram of system concept of the apparatus for extracting and sharing information according to one embodiment of the present invention.

FIG. 2 is a schematic diagram showing relationship between the message and the extraction result in a system of extracting and sharing information according to one embodiment of the present invention. A group of messages 200~209 is typically registered messages in one community. Each extraction rule 220~222 registered in the one community is different. A part matched with the extraction pattern described in each extraction rule is extracted from the messages 200~209. For example, predetermined parts 211, 212, 214, 218 are respectively extracted from each message 200, 201, 205, 207 by referring to the extraction rule 220, and the extraction result 230 is obtained. Each extraction result 230~232 is respectively generated in correspondence with each extraction rule 220~222. If this extraction result is edited by the user (manual modification of extraction result 240), a message representing the editing is generated if necessary (generation of message 241) and registered in a community of the object.

In the community management information stored in the community management information memory 8, FIG. 3A shows one example of user data, FIG. 3B shows one example of community data, FIG. 3C shows one example of belonging relation data, and FIG. 3D shows message data. As shown in FIG. 3A, the user data is consisted of a user identifier (ID), an account name and a password for log-in, a user name and a mail address, each is used for system control. As shown in FIG. 3B, the community data is consisted of a community identifier (ID), a community name, an account name used as mail address, a type representing a participation condition in the community, and a creation time of the community. A participation condition edits in the community. For example, a "public system" is a community in which all users of the system can read and write. Moreover, a "member system" is a community in which only accessible members can read and write. In case of the member system, a belonging relation between the user and the community is represented as the belonging relation data. As shown in FIG. 3C, the belonging relation data is consisted of the belonging relation between the user ID and the community ID, and a distribution method of information from the community to the user.

Furthermore, as shown in FIG. 3D, the message data is consisted of an identifier (ID) of registered message in the community, a title of the message, a parent identifier (ID) of parent message for which the message is registered as a reply, a community identifier (ID) of the community in which the message is registered, a creator identifier (ID) of a user who created the message, and a creation time of the message. An entity data including a main sentence of the message is stored in the message memory 9 for each message ID.

FIGS. 4A and 4B shows extraction rule management data stored in the community management information memory 8. As shown in FIG. 4A, extraction rule data is consisted of an identifier (ID) of an extraction rule, a creator identifier (ID) of the user who created the extraction rule, a name of the extraction rule, a community identifier (ID) of the community in which the extraction rule is registered, a last update time of the extraction rule, and the latest application time when the extraction rule is applied to the message. Furthermore, as shown in FIG. 4B, application relation data of extraction rule is consisted of a pair of an extraction rule identifier (ID) and a message identifier (ID) from which the extraction result is created by using the extraction rule.

Figure 5:
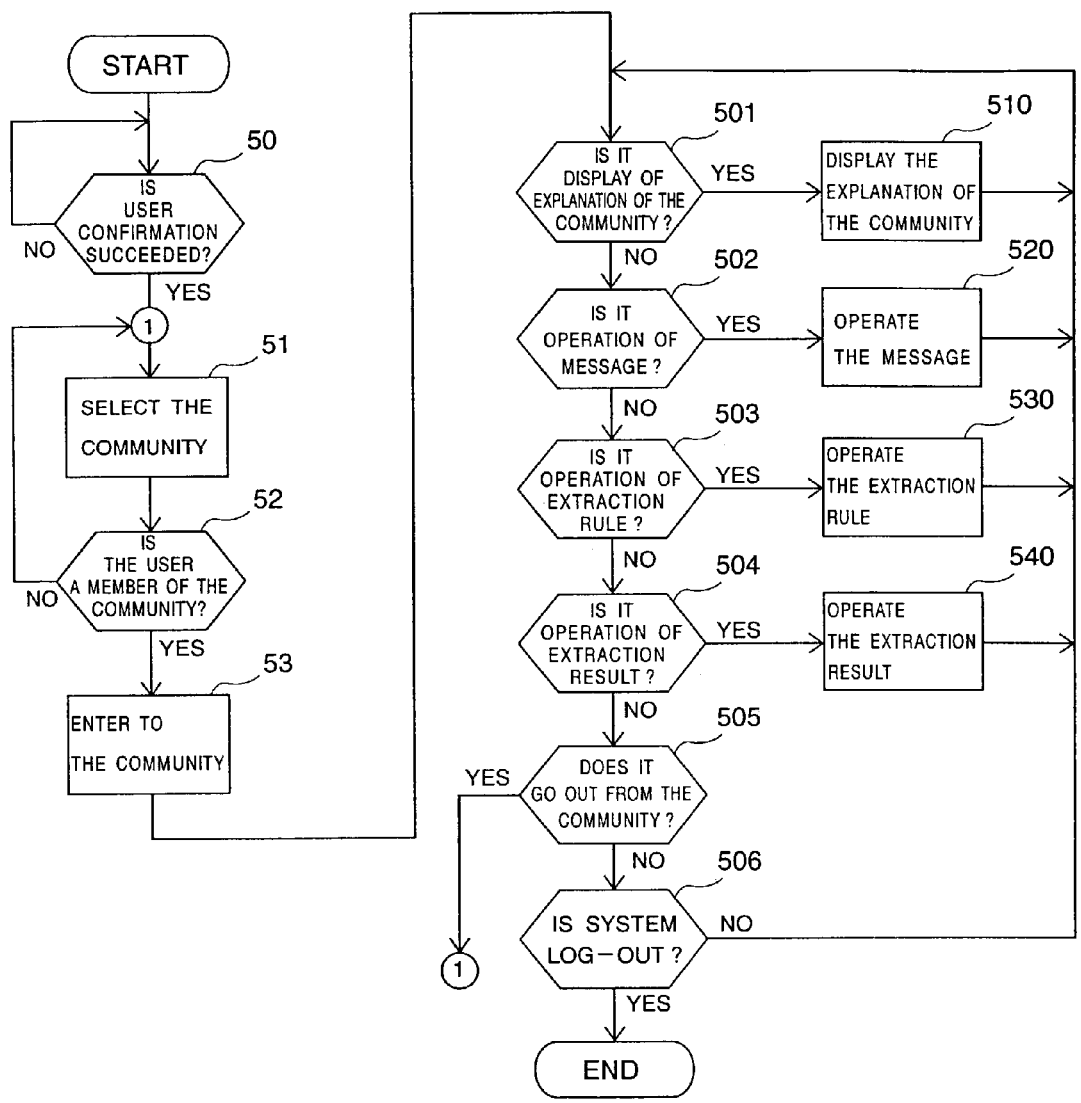
FIG. 5 is a flow chart of processing of the apparatus for extracting and sharing information according to one embodiment of the present invention.

FIG. 5 is a flow chart of processing by the apparatus for extracting and sharing information according to one embodiment of the present invention. Hereinafter, a flow of all processing is explained by referring to FIG. 5. First, a user who desires to utilize the system is confirmed as a registered user (step 50). The user confirmed as the registered user can select the community to read information (step 51). In case that the user is newly registered in the system, it is necessary to add an entry of the user to the user data (shown in FIG. 3A) through an adequate user interface. Next, it is decided whether the user is permitted to access the selected community (step 52). For example, in case of a "public system"

community, all user passed the user confirmation (step 50) and can read and edit messages. However, in case of "member system" community, it is necessary to check whether the user belongs to the selected community by referring to the belonging relation data (shown in FIG. 3C). The user passing this check can enter to the selected community (step 53).

Figure 6:
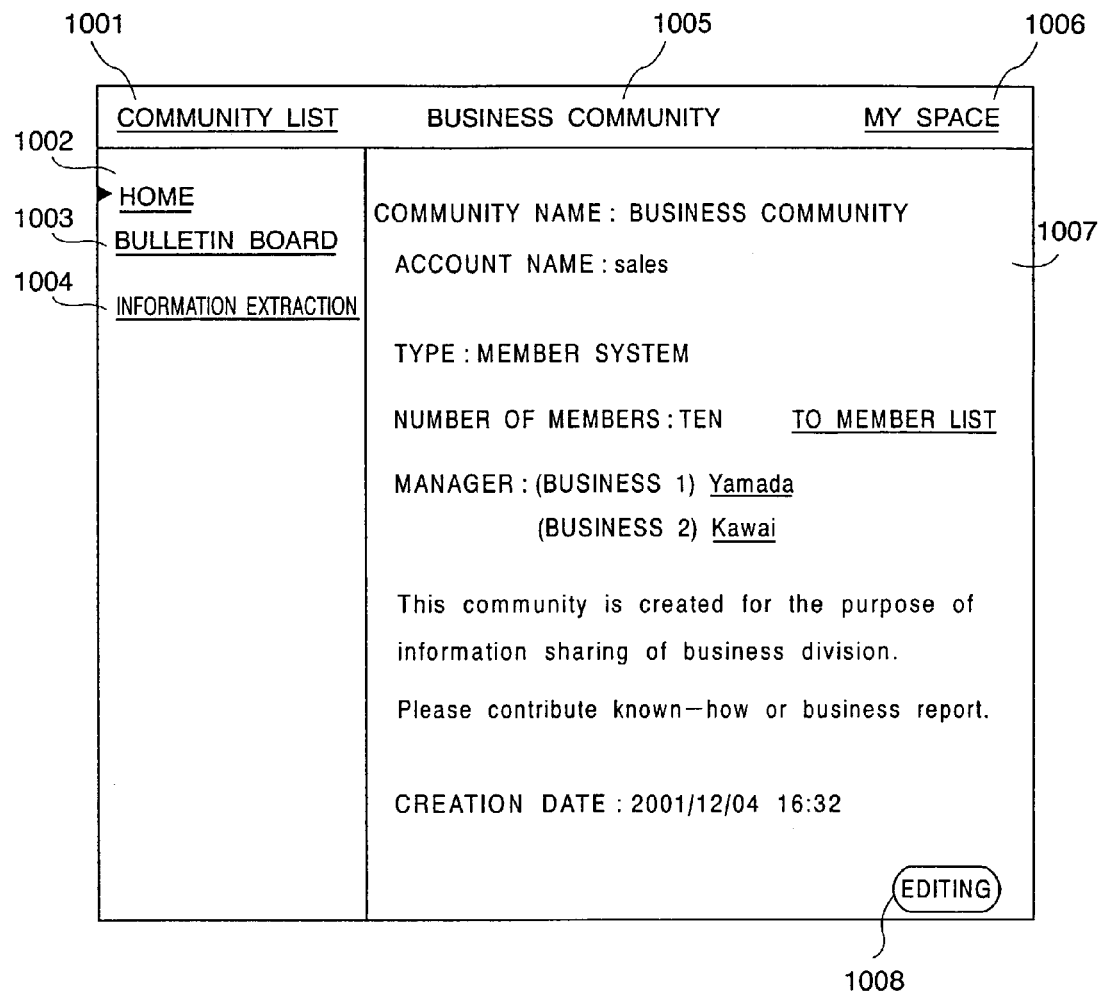
FIG. 6 is an example of a community explanation screen of the apparatus for extracting and sharing information according to one embodiment of the present invention.

Hereinafter, a series of access and operation which the user executes for various information in the community is explained in detail. First, when display of explanation of the community is selected (YES at step 501), the explanation of the community is displayed (step 510). FIG. 6 shows one example of a screen of the explanation of the community. As shown in FIG. 6, a screen to display information and explanation of the selected community is presented. In an area 1007 of community explanation, a community name 1005, an account name used for a convenient mail address to the community, a type (such as "public system" or "member system"), member information, a name of manager, an explanation sentence of the community, information of creation date, are displayed. In addition to these, a plurality of jump buttons (links) to change from this screen to another screen are located in another area of the screen. These are represented by several underlined phrases in FIG. 6. In the plurality of jump buttons, by selecting a link of community list 1001, processing is forwarded to a screen of the community registered in the system.

My space 1006 is a link to display a screen for setting the user himself who logs in. Home 1002 is a link to this community explanation screen itself, and its underlining is omitted. Bulletin board 1003 is a link to display a screen of messages exchanged and stored in the community. Information extraction 1004 is a link to display an operation screen of the extraction result information and the extraction rule. By selecting an editing button 1008, a screen to edit the set and the explanation sentence displayed on the community explanation screen is presented.

Figure 7:
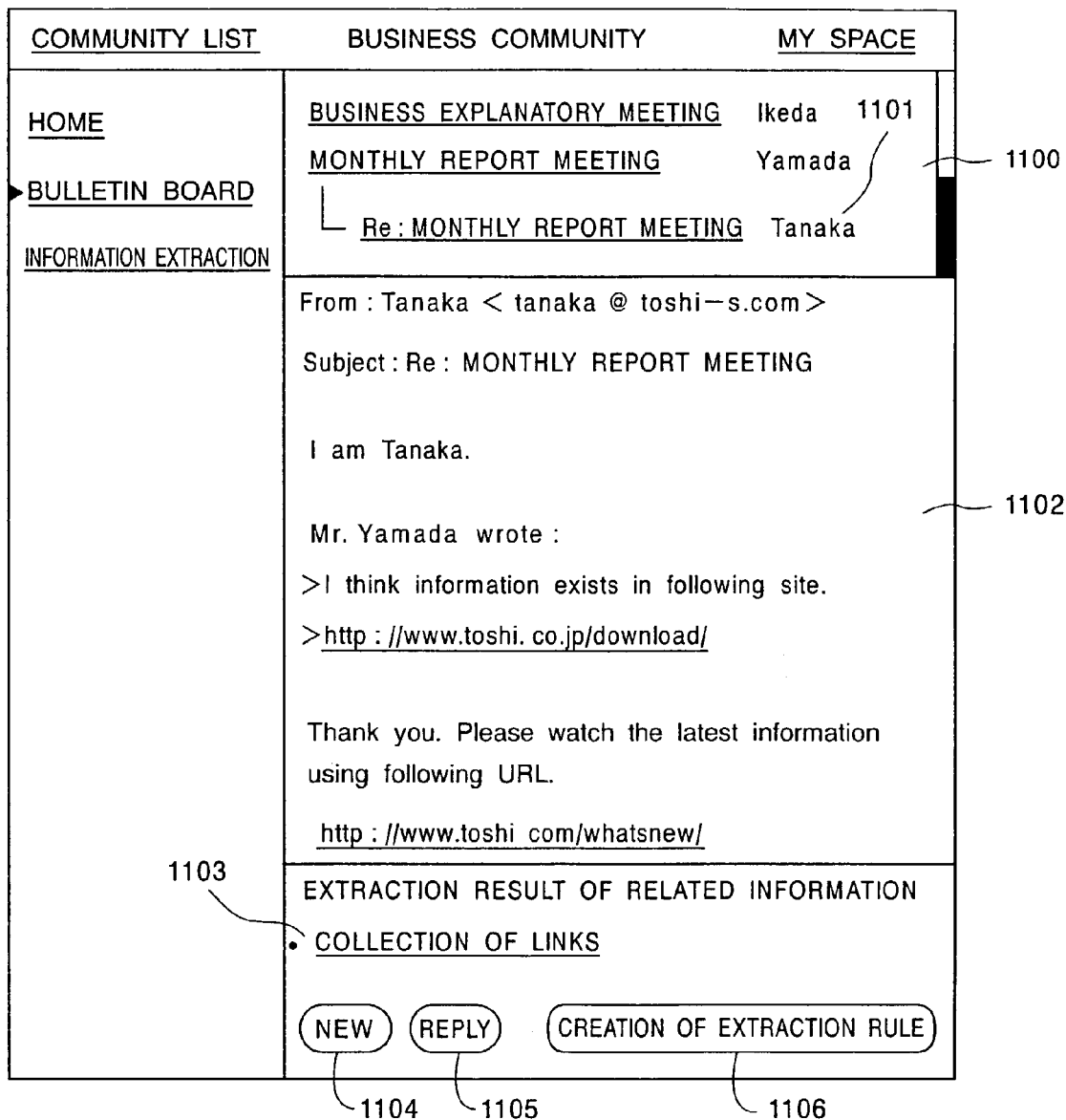
FIG. 7 is an example of a bulletin board screen of the apparatus for extracting and sharing information according to one embodiment of the present invention.

Next, when operation of the message is selected (YES in step 502), processing is forwarded to the operation of the message (step 520). FIG. 7 shows one example of a screen of the message operation. This screen is also an example of a display in case of selecting the "bulletin board" 1003 in FIG. 6. In an area 1100 of FIG. 7, a part of the messages registered in the community is displayed. In a line 1101 of FIG. 7, a title and a creator's name of the message of which the contents are displayed at the present time are presented with an indent representing a reply relation. For example, in an area 1102 of FIG. 7, the contents of message "Re: MONTHLY REPORT MEETING" 1101 is displayed. By selecting "collection of links" button 1103, the extraction result of related information is displayed. By selecting "new" button 1104, the user can create new message. Furthermore, "reply" button 1105 is the same as the "new" button 1104 and the user can create a reply message under a condition that the message displayed at the present time is regarded as a parent article or message. In both cases, FIG. 8 shows an example of a screen of message creation. In the message creation screen of FIG. 8, a creator's name 1901 (non-editing by the user), a subject 1902, a main sentence 1903 of the message, a flag 1904 to select whether information is newly extracted from this article (non-selection for default), a "send" button 1905 to register the message, and a "cancel" button 1906, exist. In the operation 1904 "new extraction based on this article", for example, in case that a member of the community creates the minutes of meeting and contributes (registers) the minutes as a message to the community, a part of the message is extracted when the message is contributed. In this case, the minutes are additionally displayed in a list of the extraction result and omission of an important item can be prevented. Detailed processing of extraction operation is explained afterwards.

Figure 10:
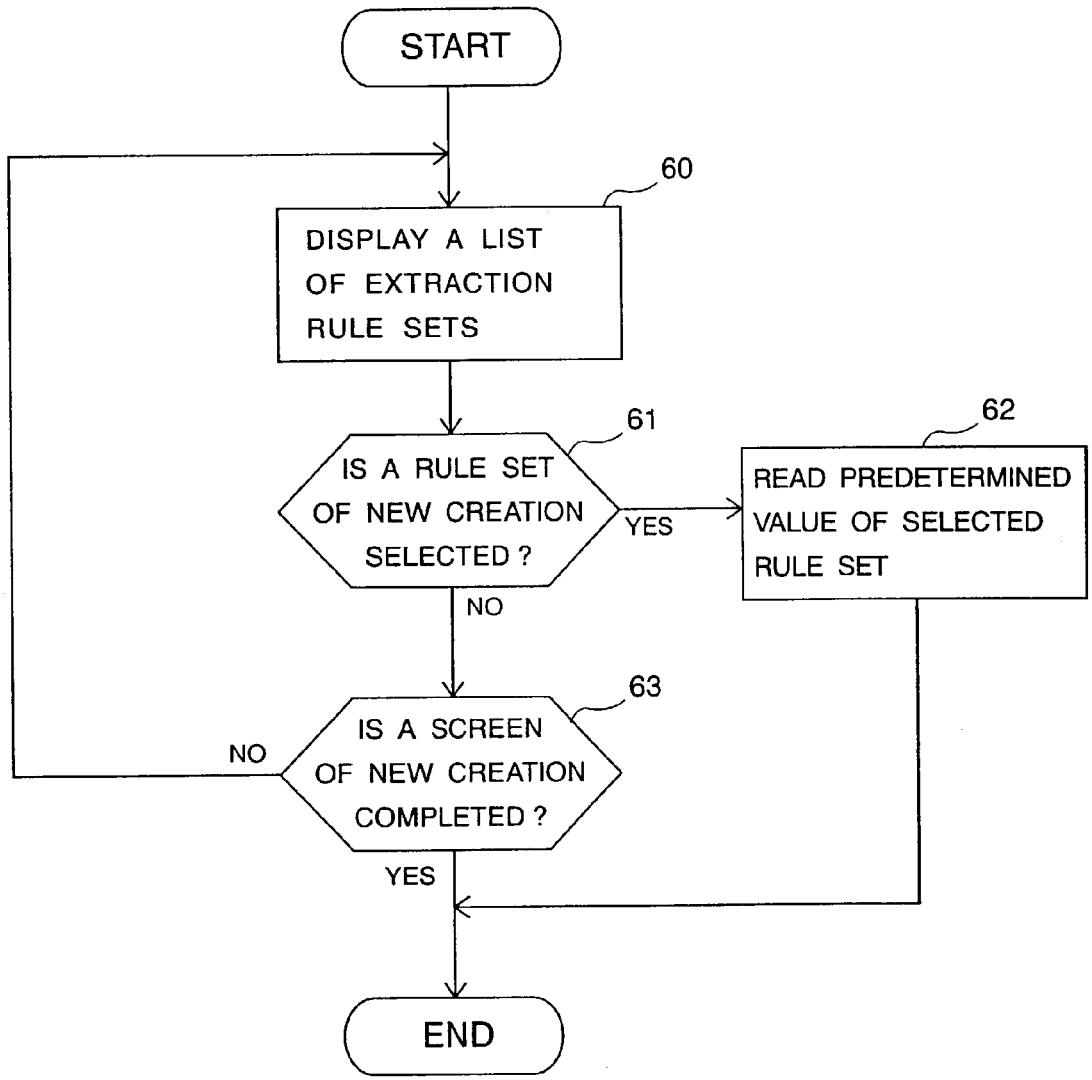
FIG. 10 is a flow chart of creation processing of new extraction rule of the apparatus for extracting and sharing information according to one embodiment of the present invention.

Next, when an operation of the extraction rule is selected (step 503 in FIG. 5), processing is forwarded to the operation of the extraction rule such as display, creation and editing of the extraction rule (step 530). New creation of the extraction rule is executed in case of reading the message (FIG. 7), creating the message (FIG. 8), and editing a list of the information extraction result (FIG. 9). In any cases, as shown in a flow chart of creation of extraction rule in FIG. 10, a list of extraction rule sets to create a new extraction rule is displayed (step 60). When a user selects one of the extraction rule sets (step 61), a predetermined value of the one extraction rule set is read out (step 62). The user can select the extraction rule set from a menu 1500 on the editing screen of the list of information extraction result. In the example shown in FIG. 9, five extraction rule sets 1501 "date information", "collection of links", "collection of questions and answers", "the minutes" and "call" are prepared as each extraction target in the menu. After one extraction rule set ("date information" in FIG. 9) is selected, processing is forwarded to editing of the extraction rule. The editing of the extraction rule is explained by referring to a flow chart of editing of the extraction rule (FIG. 11), an example of editing screen of the extracting rule (FIG. 12) and an example of extraction rule data (FIG. 13). In one embodiment, the extraction rule is consisted of "extraction pattern", "extraction target" and "display format". The extraction pattern represents information or component to be extracted from the message.

Figure 11:
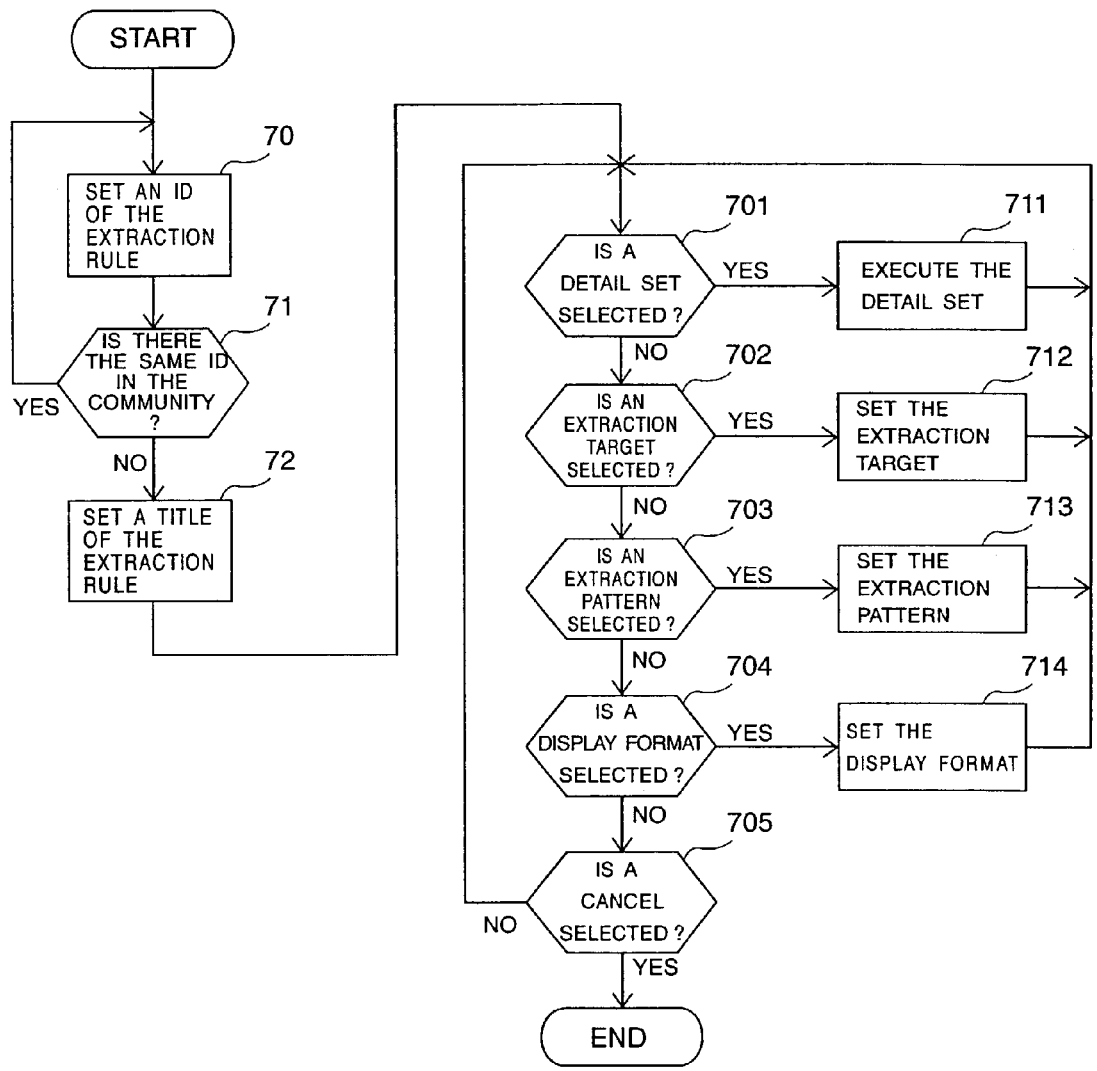
FIG. 11 is a flow chart of editing processing of the extraction rule of the apparatus for extracting and sharing information according to one embodiment of the present invention.
Figure 12:
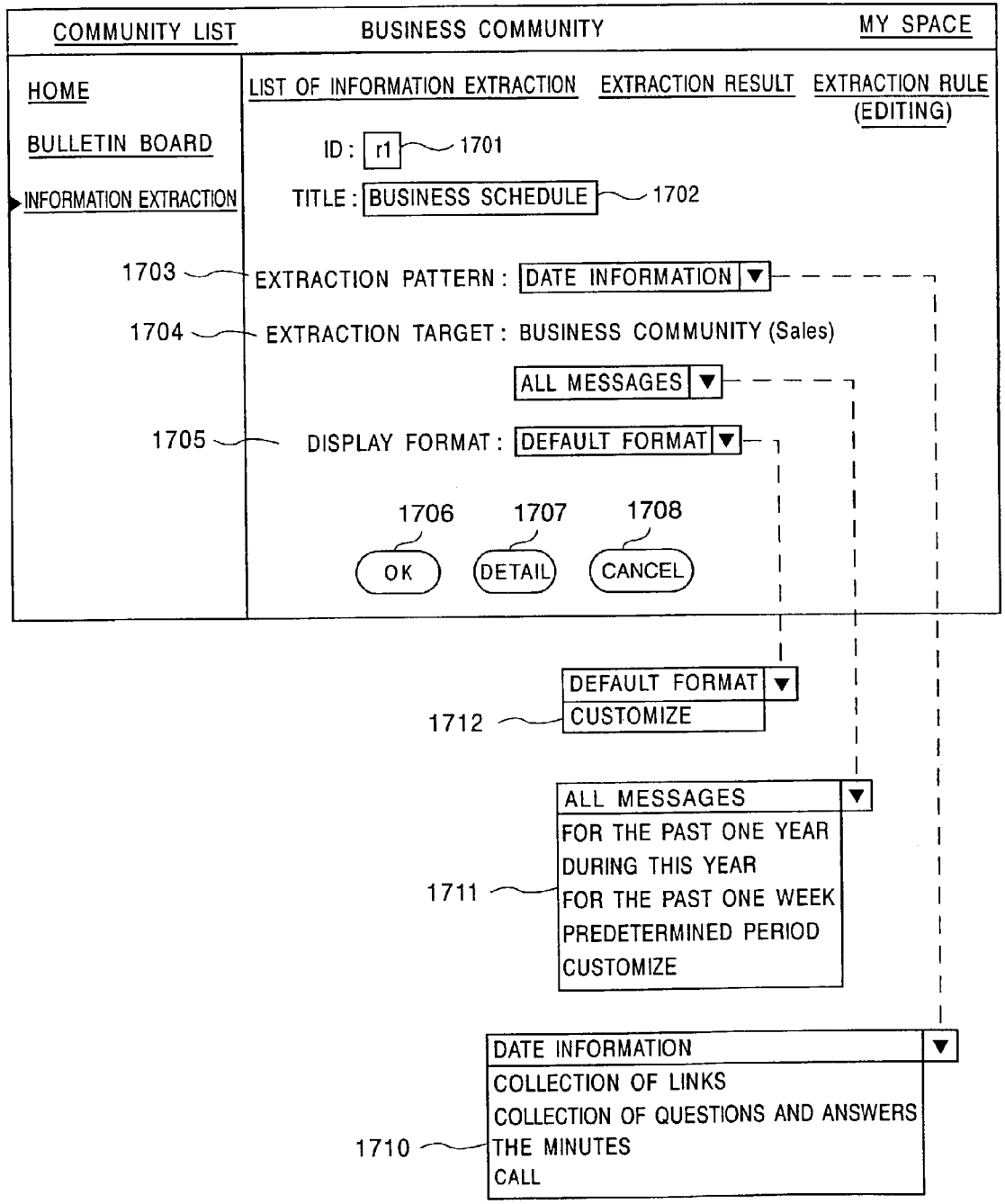
FIG. 12 is an example of an extraction rule editing screen of the apparatus for extracting and sharing information according to one embodiment of the present invention.

In the flow chart of editing of the extraction rule of FIG. 11, after ID of the extraction rule is set without duplication (step 70, 71), a title of the extraction rule is set (step 72). Then, any of the detail sets (step 701), the extraction target (step 702), the extraction pattern (step 703) and the display format (step 704), is selectively set (step 711~714). In FIG. 12, ID number 1701, the title 1702 and the extraction pattern 1703 are set. The extraction target is basically a community to which the extraction rule belongs. However, as shown in the extraction target 1711 of FIG. 12, a range (time period) of the message is also restricted as a target. As for the display format of extraction information, a standard display format of each extraction pattern exists. In order to further customize the extraction target or the display format, detail editing is executed by pushing a "detail" button 1707. The detail editing is executed by directly editing the extraction rule data in FIG. 13.

As for "extraction pattern", a plurality of typical patterns to be extracted are prepared in order for the user to easily set. For example, "date information" is used to extract an year-month-day part ("date"), a time part ("time"), an event part ("what") representing what happens at the date, and a place part ("where") representing at where the event happens in case that a vocabulary related to a date appears in the message. In this case, the extraction pattern such as "date information" is called a "class". The year-month-day part, the time part, the event part and the place part to be concretely extracted, are called a "class attribute". For example, the class "date information (schedule)" of the extraction pattern includes four class attributes: "which day (date)", "what time (time)", "what" and "where". As for other classes "collection of links", "collection of questions and answers", "the minutes" and "call", the class attribute to be extracted is respectively prepared. For example, "collection of links (Links)" includes two class attributes "link" and "description", "collection of questions and answers (QA)" includes two class attributes "question" and "answer", "the minutes" includes one class attribute "utterance (remark)", "call" includes one class attribute "business (what)". Furthermore, each class includes a basic class attribute "extraction source message (message)". The class "message" includes the class attributes "creator (author)", "creation date (date)", "ID (id)" and "parent message (parent)". Each extraction pattern of the class corresponds to an extraction module for detail pattern matching. For example, in the extraction module to extract "date information", a function to extract various character pattern representing not only "mm month, dd day, yyy year" such as "Oct. 9, 2001" but also "mm/dd" "mm-dd-yyy" is included for extraction year-month-day part. By using this function, smooth pattern matching can be executed. Furthermore, a standard pattern to certainly acquire a part corresponding to each class attribute of the extraction pattern from the message can be regulated. For example, as for "date information", the standard pattern shown in FIG. 14 is set. Concretely, as shown in FIG. 14, class attribute "year-month-day (date)" and "time" are described after the expression "Date:", class attribute "where" is described after the expression "Place:", and class attribute "what" is described after the expressions "Contents:", "Title:" and "Subject:". By using this standard pattern, a value corresponding to the class attribute can be obtained. Furthermore, in case of editing the extraction pattern, in order for the user to confirm the extraction pattern on a screen, a typical extraction pattern may be displayed as shown in FIG. 15.

FIG. 16A shows an image to extract date information from the message by using the standard pattern and FIG. 16B shows an image to extract date information from the message by using another pattern. In FIG. 16A, the contents described after "Date:" and "Contents:" is set as the class attribute. In FIG. 16B, an inverse part 2411 is set as "date" and a paragraph 2412 including the inverse part 2412 is set as "the contents". However, if "subject" header field of the message includes character line above predetermined length, the characters of the header field may be adopted as "the contents".

Return to FIG. 5. If an operation of the extraction result is selected (step 504 in FIG. 5), the operation of the extraction result such as display or editing of the extraction result is executed (step 540). Hereinafter, a process to display the extraction result including processing of the information extraction unit 6 in FIG. 1 is explained by referring to FIG. 17. First, the user selects the extraction result to read from a list of extraction results (step 80). FIG. 18 shows one example of a screen of the list of extraction results. In FIG. 18, "business schedule" 1202, "list of person in charge", "questions and answers" and "collection of links" 1205, respectively represent a title of the extraction result and a link to a screen to display the extraction result. Accordingly, when the user selects one title, a screen of the extraction result corresponding to the title is displayed. A date of each title represents the latest update day of the extraction result. For example, "Feb. 10, 2002" 1203 represent the latest update day of "business schedule" 1202. The "update!" 1204 represents that, for example, the extraction result was acquired within the last week, i.e., status of the extraction result changed. Furthermore, "editing" 1201 represents a link to a screen to edit a list of extraction results.

Figure 17:
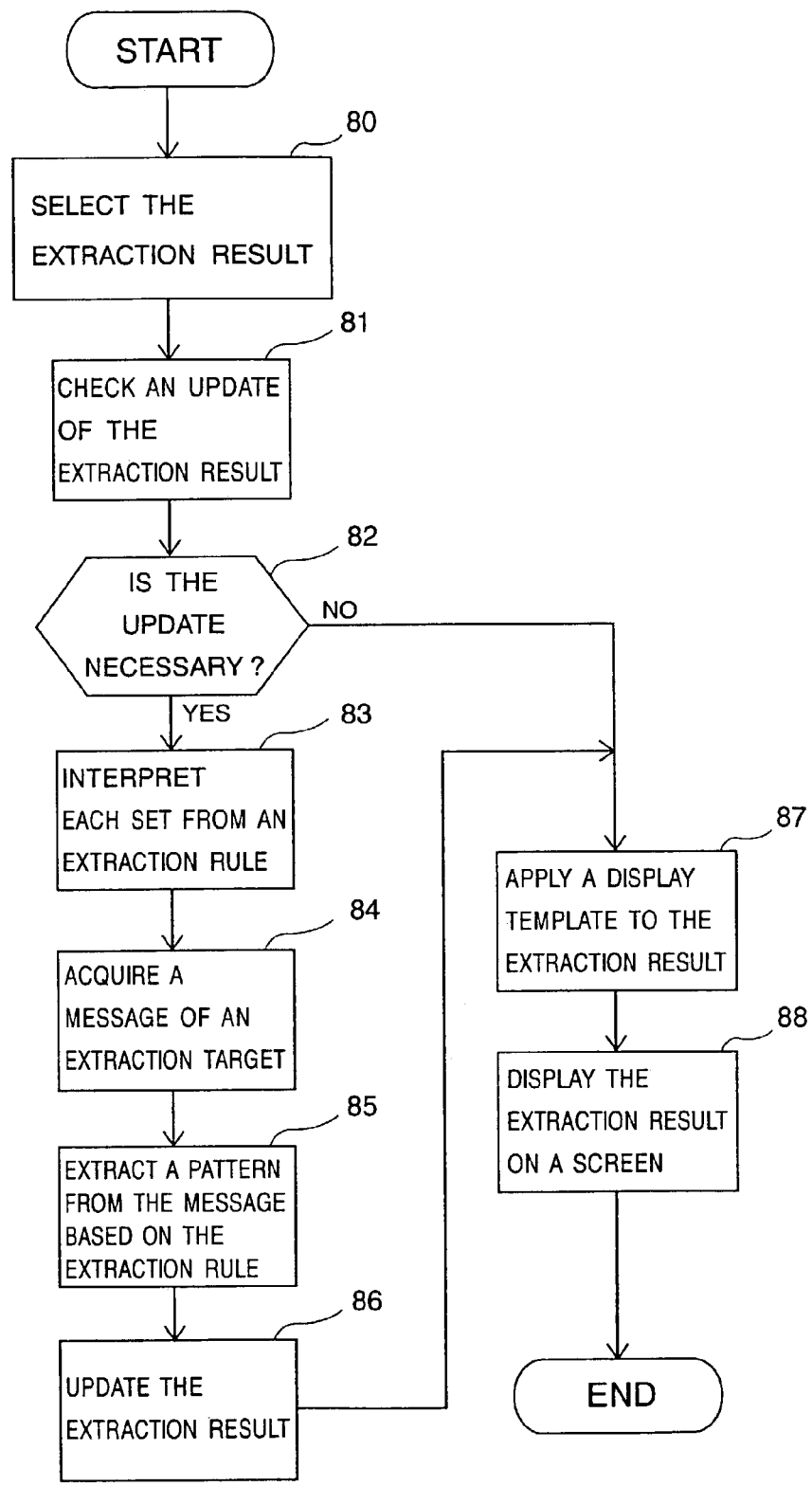
FIG. 17 is a flow chart of display processing of the extraction result of the apparatus for extracting and sharing information according to one embodiment of the present invention.
Figure 18:
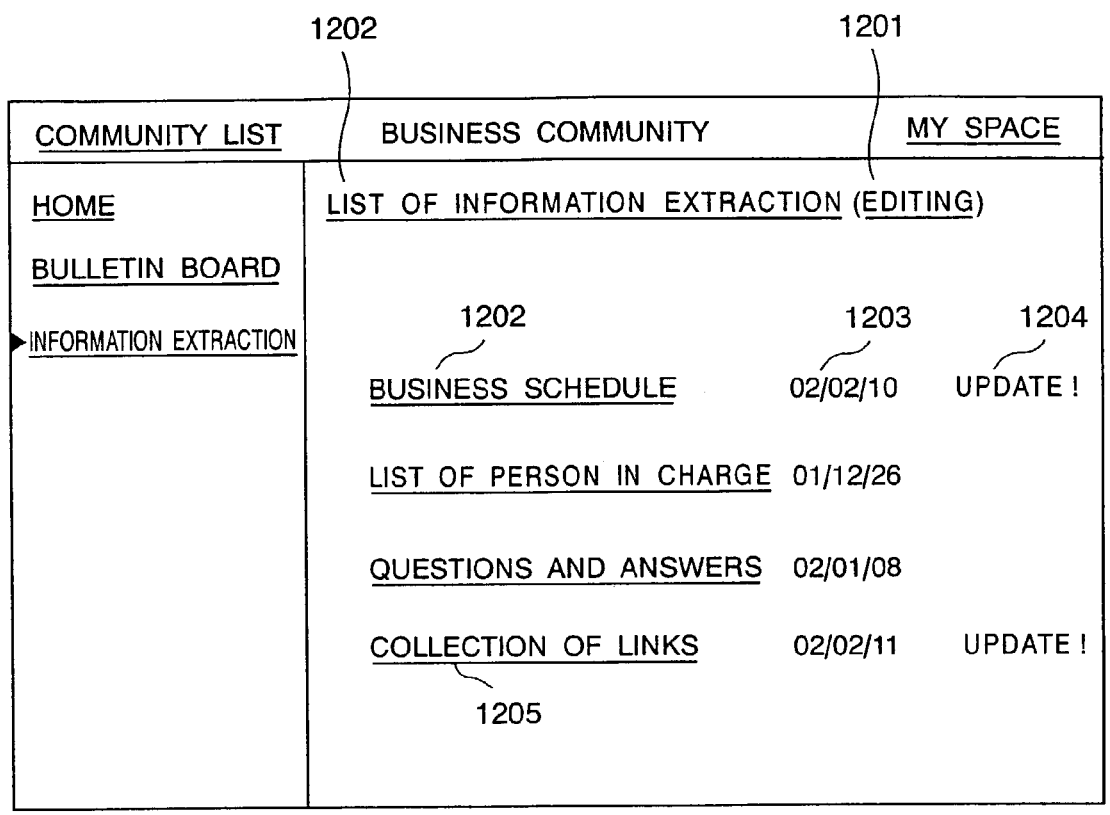
FIG. 18 is an example of an information extraction screen of the apparatus for extracting and sharing information according to one embodiment of the present invention.

In FIG. 17, after a title of the extraction result to be displayed is selected, it is checked whether the extraction result should be updated (step 81). Concretely, after a time since the previous extraction processing was executed, it is checked whether new information was added to the extraction target indicated by corresponding extraction rule or whether the extraction rule itself was updated. In either case, it is decided that the extraction result should be updated. If it is not necessary to update the extraction result (step 82), by applying a template to display (step 87), the extraction result is arranged as a format suitable for screen display (step 88). On the other hand, if it is necessary to update the extraction result, the extraction result is updated by executing processing of steps 83~86. First, each set to extract information is interpreted from the corresponding extraction rule (step 83). Concretely, for example, each set is interpreted from extraction rule data shown in FIG. 13. In FIG. 13, the extraction pattern, the extraction target and the display format are described by XML (extensive Markup Language) format. For example, this data is created by the system through a GUI (Graphical User Interface) in FIG. 13 or by the user's direct editing for file.

Next, the text of message of the extraction target is acquired from the message memory 9 in FIG. 1 (step 84 in FIG. 17). Furthermore, a pattern indicated by the extraction pattern in the extraction rule is extracted from the text of the message (step 85). In this case, by using a pattern extraction module prepared for the class as each extraction pattern, the extraction result information is acquired. For example, a format of the extraction result data is created by expression of XML shown in FIG. 19, and an extracted value of class attribute is listed by unit of a pair of the class and the message. In case of creating the extraction result data, application relation data of the extraction rule shown in FIG. 4B is updated. In this case, as shown in "collection of links" 1103 of FIG. 7, a title of the extraction result information of which a part is extracted from a message is displayed on a screen of the contents of the message.

Figure 20:
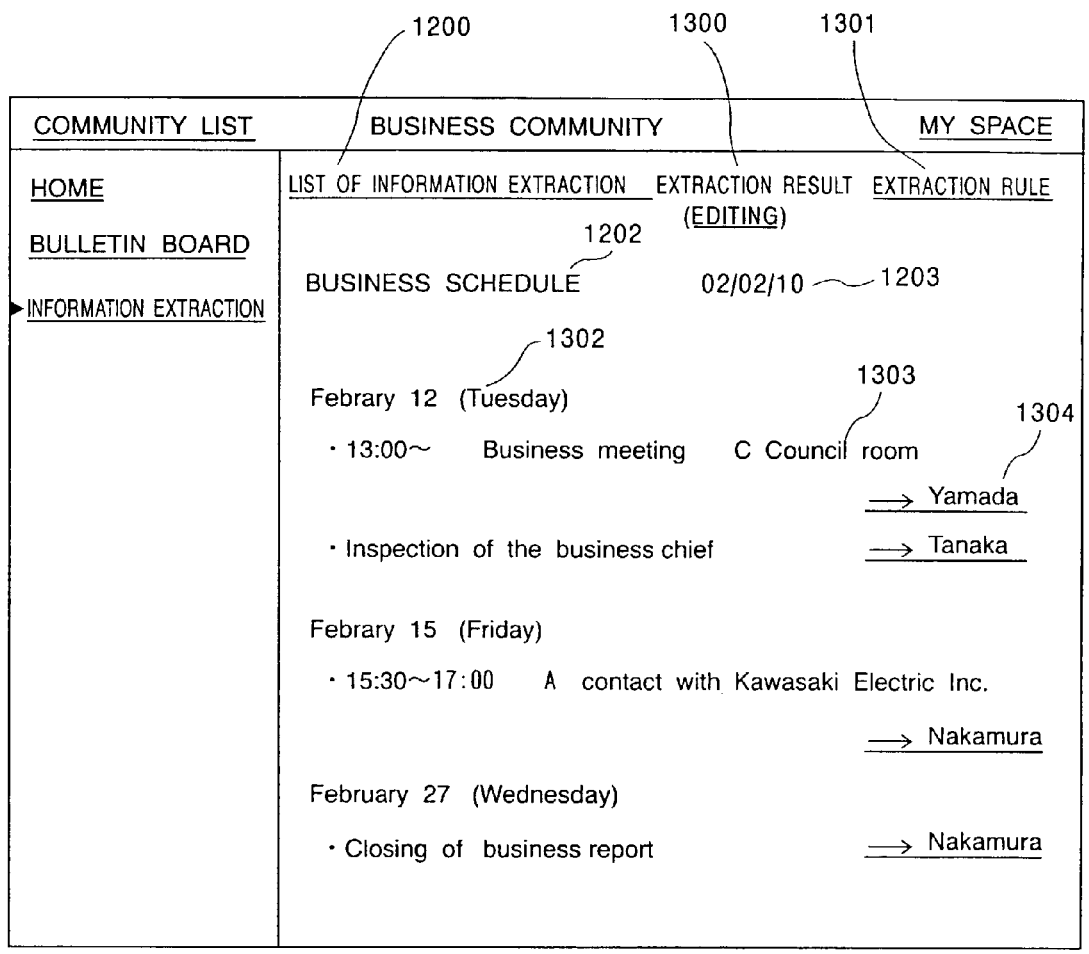
FIG. 20 is an example of an extraction result display screen of the apparatus for extracting and sharing information according to one embodiment of the present invention.

In the data format of the extraction result shown in FIG. 19, information to display the extraction result is not included. Accordingly, by using a part indicated as the display format described in the extraction rule (step 87), a format of the extraction result is converted to HTML (Hyper Text Markup Language) in the case of WWW. The created HTML file is displayed on a screen (step 88). For example, when "business schedule" 1202 is selected on a screen shown in FIG. 18, a screen of the extraction result shown in FIG. 20 is displayed. In the same way, when "collection of links" 1205 is selected on the screen shown in FIG. 18, a screen of the extraction result shown in FIG. 21 is displayed. In upper part of the screen of the extraction result shown in FIG. 20, a link 1200 to return to a screen of the list of information extraction shown in FIG. 18, characters 1300 representing the extraction result and a link 1301 to display the corresponding extraction rule, are respectively located. In addition to this, on the screen of the extraction result, a title 1202 of the extraction rule, the latest application time 1203 of the extraction rule, date information 1302 and schedule information 1303 extracted from the message and listed based on the display format indicated in the extraction rule, a link 1304 to a message of extraction source, are located.

In an editing screen of a list of information extraction shown in FIG. 9, set of display order of the list of information extraction, addition, deletion, copy and unification of the extraction rule, are indicated. First, by using a check box of each extraction result, an item of the extraction rule to be edited is selected. By pushing "up" button 1503, the item of the extraction rule is moved by one unit upward on the list. By pushing "down" button 1504, the item of the extraction rule is moved by one unit downward on the list. By pushing "copy" button 1505, the item of the extraction rule is memorized. By pushing "put" button 1506, the memorized item of the extraction rule is put on the list by automatically changing the title. For example, when a check box of "business schedule" 1202 is indicated, "copy" button 1505 is pushed and continuously "put" button 1505 is pushed, for example, new extraction rule "copy of business schedule" of which the contents is the same as the extraction rule "business schedule" except for the title is created on the same screen. This copied extraction rule can be put on or used by another community. Furthermore, by pushing "deletion" button 1507, the selected extraction rule is deleted. By selecting a plurality of extraction rules and by pushing "unify" button 1508, new extraction rule is created as unification of the plurality of extraction rules.

Figure 22:
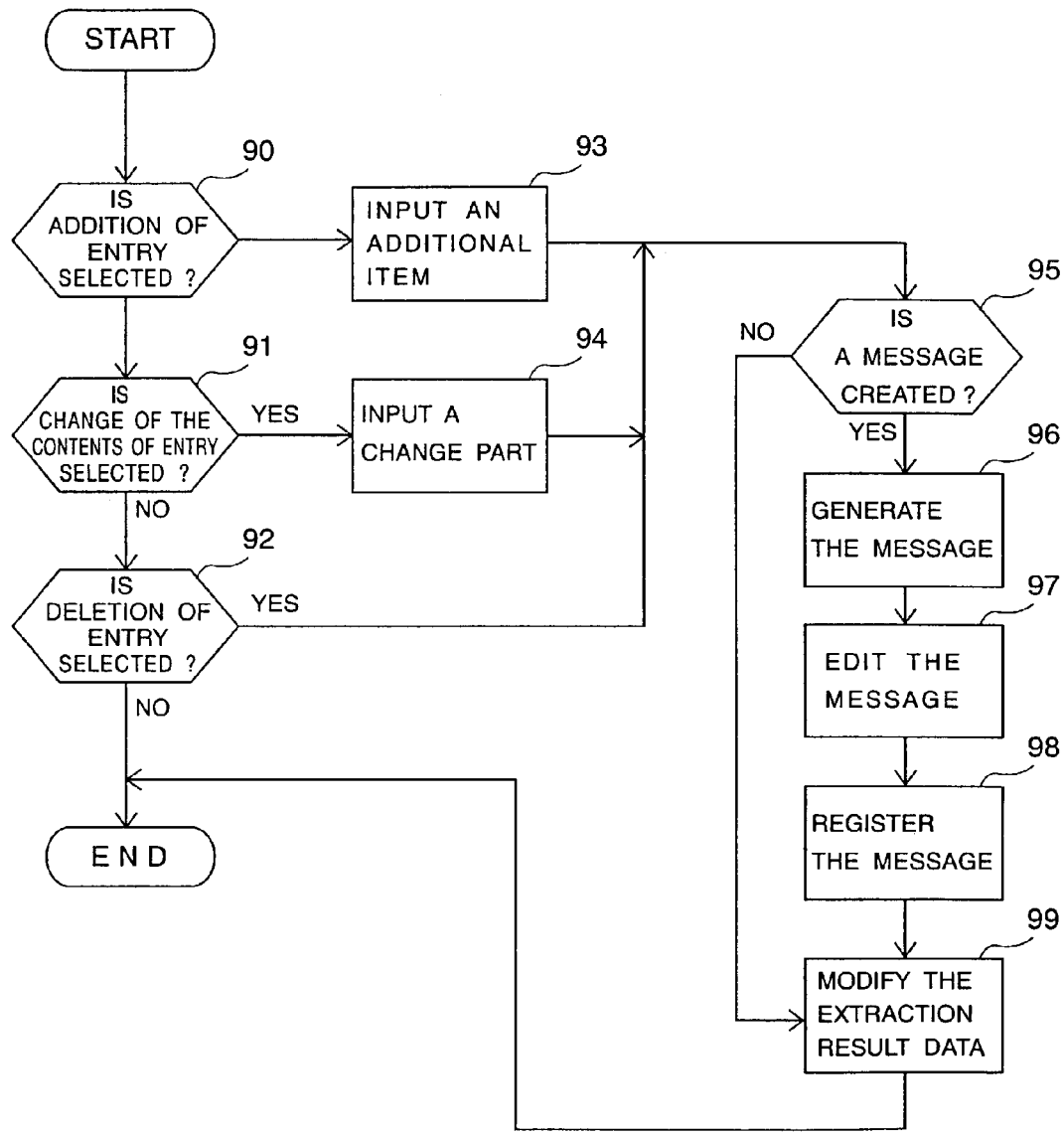
FIG. 22 is a flow chart of editing processing of the extraction result of the apparatus for extracting and sharing information according to one embodiment of the present invention.

It is not always that the extraction result using the extraction rule is usually adequate information for the user. Accordingly, in order for the user to manually edit a part of the extraction result or to add new information to the extraction result while reading the extraction result, a means for editing the extraction result is prepared. Hereinafter, a processing of editing the extraction result is explained. FIG. 22 is a flow chart of processing of the editing of the extraction result according to one embodiment of the present invention. In FIG. 22, the editing operation of the extraction result can be addition of an entry to the extraction result (step 90), change of the contents of an entry (step 91) or deletion of an entry (step 92). FIG. 23 shows one example of a screen to edit the extraction result. As shown in FIG. 23, "addition" button 1803, "change" button 1804, "deletion" button 1805, and a check box 1802 of each entry of the extraction result, are located. In case of adding the entry, the "addition" button 1803 is pushed. In the case of changing the contents of the entry, the check box of one entry to be changed is indicated and the "change" button 1804 is pushed. In the case of deletion, each check box of at least one entry to be deleted is indicated and the "deletion" button 1805 is pushed.

In the case of selecting addition or change of the entry, for example, a screen as shown in FIG. 24 is displayed. In the screen of FIG. 24, an input field for each item of class attribute extracted by corresponding extraction rule is located. Concretely, the user can selectively input each item related to date information, i.e., "date" 2001, "time" 2002, "place" 2003 and "contents" 2004. In case of selecting change of the entry, the contents of item acquired as the extraction result is displayed. The user inputs the contents to add or change to the input field (step 93 and 94 in FIG. 22). In this case, if a condition "creation of message" is valid as shown in the check box 2005 of FIG. 24, the editing result is stored as a mail in the community and can be distributed to each member of the community (step 95 in FIG. 22). After inputting the editing contents, by pushing "update" button 2006, a creation screen of the contents of message registration shown in FIG. 25 is presented in the case of creating a message. In this case, the contents of editing of the extraction result are generated as a part of the text of the message (step 96 in FIG. 22).

In FIG. 25, the user selects one from a plurality of message distribution methods 2100~2102. In the case of "not post by mail" 2100, the user's created message is registered as a message of the community, but not informed by a mail. Briefly, even if each member usually receives a message of the community by a mail, the contents of the update are not informed to each member by a mail. In the case of "usual distribution" 2101, the update contents as a message are distributed based on set of message distribution method of each member of the community. Briefly, the update contents as a message is processed in the same way of a usual message. In the case of "post by mail to all members" 2102, the update contents as a message is informed to all members of the community by a mail irrespective of each member's set of distribution method. This set 2100~2102 of distribution method may be executed in a message creation screen (FIG. 8).

In FIG. 25, an area 2103 is a free description part to create a message. In the area 2103, the user who edited the extraction result can freely describe by himself/herself (step 97 in FIG. 22). A part 2104 automatically created by the system is combined with the free description part 2103, and this combination contents is registered as a message. In the case of pushing "OK" button 2105, this message is registered in the community by the set distribution method (step 98 in FIG. 22). In this case, the message created from change or deletion of the extraction result is registered as a reply for an extraction source message (parent message from which the extraction result is created). On the other hand, in the case of indicating deletion of an entry of the extraction result, a screen to select whether the message is created is displayed. If the user creates the message on the screen, processing is executed in the same way of above-mentioned processing of message creation/registration.

Last, the contents of editing of the extraction result are reflected in the corresponding extraction result date (step 99 in FIG. 22). Concretely, as shown in FIG. 26, a part 2501 to describe a correction (modification) is located in the extraction result data and separately managed from the extraction result 2500 to which the extraction rule is applied. In FIG. 26, in a tag <modify>, a matter which the extraction result is manually modified is described. In the tag <modify>, a modification mode is indicated. As the modification mode, the entry is replaced in case of addition or change of the extraction result and the entry is hidden in the case of deletion of the extraction result.

FIG. 27 shows an example of the case that reflection in the extraction result is executed by a message. In the example shown in FIG. 27, Mr. Nakamura as a sender quotes Mr. Tanaka's message and changes the contents of date information as a reply message. In this case, if the extraction rule to extract date information is applied to the reply message, date information is extracted from both the reply message and Mr. Tanaka's message. Concretely, in FIG. 27, a description 2601 "Feb. 10, 2002" in quotation sentence of the reply message 2600 is also included in Mr. Tanaka's message. It often happens that the same date information is doubly extracted as different information. Accordingly, a word clearly included in a quotation sentence is not extracted from the message. Furthermore, in the contents (editing result) in which characters "[change]" is located at the head of line following from the quotation part, if the item name in the contents coincides with a part of standard pattern for extraction in the quotation sentence, the extraction result of the extraction source message (parent message) is replaced by the contents. Concretely, in FIG. 27, the extraction result of the parent message originally including "Date: Feb. 10, 2002" 2601 is replaced by the editing result "Date: Feb. 10, 2002, 15:0018 17:00" 2602. Briefly, by creating a reply message for a parent message from which the quotation sentence is extracted, the extraction result of the parent message is also changed by the editing result of the reply message.

As mentioned-above, according to an embodiment of the present invention, in a common system in which a plurality of users exchange and jointly own messages, the information extraction rule is easily created and the extraction result information are jointly owned by each user. As a result, the communication can be promoted with easy arrangement format of the messages while each user is conscious of arrangement of important information in the messages afterwards. Furthermore, in addition to meeting program or schedule information, a part to be essentially referred or reused can be extracted from the messages as a document format.

For embodiments of the present invention, the processing of the present invention can be accomplished by one or more computer-executable programs, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention, the computer is not limited to the personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for extracting and sharing information, comprising:
   a message exchange unit configured to receive a plurality of messages from a plurality of users and distribute the plurality of messages in a community in which the plurality of users participate;
   a message memory configured to store the plurality of messages received by said message exchange unit;
   an extraction rule memory configured to store a plurality of extraction rules applicable for a message, each extraction rule including an extraction pattern, an extraction target and a display format;
   an information extraction unit configured to extract information from the plurality of messages stored in said message memory by referring to the plurality of extraction rules, an extraction result information being generated in correspondence with each extraction rule;
   an extraction result memory configured to store the extraction result information by said information extraction unit;
   an extraction result editing unit configured to edit the extraction result information stored in said extraction result memory;
   a message generation unit configured to generate an editing message representing editing of the extraction result information;
   wherein information of said message memory, said extraction rule memory, and said extraction result memory are shared by the plurality of users in the community;
   a community management information memory configured to store user data, community data, belonging relation data and message data,
   wherein the user data includes at least a user identifier and a user name, the community data includes at least a community identifier, a community name and a type,
   the belonging relation data includes at least a belonging relation between the user identifier and the community identifier and a distribution method,
   the message data includes at least a message identifier, the user identifier of the one of the users who created a first message of the plurality of messages, a parent message identifier of another message to which the first message is replied.

2. The apparatus according to claim 1, wherein said community management information memory further stores extraction rule data and application relation data associated with the extraction rule, the extraction rule data including at least an extraction rule identifier, the user identifier of the user who created the extraction rule, the community identifier to which the extraction rule belongs, a last update time and a latest application time of the extraction rule, the application relation data including at least an application relation between the extraction rule identifier and the message identifier.

3. The apparatus according to claim 1,
   further comprising a community information display configured to selectively output an explanation screen of the community, a bulletin board screen of at least the first message stored in said message memory, and an information extraction screen of the extraction result information stored in said extraction result memory.

4. The apparatus according to claim 3,
   further comprising an extraction rule editing unit configured to edit the extraction rule stored in said extraction rule memory.

5. The apparatus according to claim 4,
   when the one of the users selects creation of a new extraction rule on the information extraction screen,
   wherein said community information display outputs a plurality of extraction rule sets each corresponding to a different extraction object.

6. The apparatus according to claim 5,
   when the one of the users selects one of the rule sets,
   wherein said extraction rule editing unit generates an extraction rule editing screen based on a predetermined value of the one of the rule sets through said community information display.

7. The apparatus according to claim 6,
when the one of the users selects the extraction pattern, the extraction target and the display format on the extraction rule editing screen,
wherein said extraction rule editing unit sets the extraction pattern, the extraction target and the display format to the extraction rule in response to the selection.

8. The apparatus according to claim 6,
when the one of the users selects a detail set on the extraction rule editing screen,
wherein said extraction rule editing unit sets data for the new extraction rule data based on input from the one of the users.

9. The apparatus according to claim 6,
wherein said extraction rule editing unit prepares a standard pattern representing each class attribute of the extraction pattern, and extracts information from the first message corresponding to the extraction target by using the standard pattern.

10. The apparatus according to claim 4,
when the one of the users selects one from the list of extraction result information as copy of the extraction rule on the information extraction screen,
wherein said extraction rule editing unit copies the extraction rule applied to the one extraction result to another community.

11. The apparatus according to claim 4,
when the one of the users selects a plurality of extraction results from the list of extraction result information as unification of the extraction rules on the information extraction screen,
wherein said extraction rule editing unit generates new extraction rule by unifying each extraction rule applied to the plurality of extraction results.

12. The apparatus according to claim 3,
when the one of the users selects one extraction result from a list of the extraction result information in the information extraction screen,
wherein said extraction result editing unit decides whether it is necessary to update the one extraction result information.

13. The apparatus according to claim 12,
wherein said extraction result editing unit, deciding to update the one extraction result information, interprets the extraction pattern and the extraction target from the extraction rule applied to the one extraction result information, extracts information from the first message corresponding to the extraction target by using the extraction pattern, and updates the one extraction result using the extracted information.

14. The apparatus according to claim 13,
wherein said extraction result editing unit, deciding to update the one extraction result information, outputs the one extraction result by applying the display format of the extraction rule through said community information display.

15. The apparatus according to claim 13,
when the one extraction result is updated using the extracted information,
wherein said extraction result editing unit outputs the one extraction result by applying the display format of the extraction rule through said community information display.

16. The apparatus according to claim 3,
when the one of the users selects one listed message from a group of listed messages on the bulletin board screen,
wherein said community information display additionally outputs a link of extraction result information related to the one listed message on the bulletin board screen.

17. The apparatus according to claim 3,
when the one of the users selects one of addition, change, and deletion of an entry of the extraction result information on the information extraction screen,
wherein said extraction result editing unit edits the entry of the extraction result information in response to the user's selection.

18. The apparatus according to claim 17,
when the one of the users selects creation of an editing message about editing of the extraction result information on the information extraction screen,
wherein said extraction result editing unit outputs a message creation screen of the editing message including the contents of the editing through said community information display, and registers the editing message as a reply of a source message originally including the extraction result information.

19. The apparatus according to claim 18, if the one of the users selects distribution of the message on the message creation screen,
wherein said message exchange unit distributes the editing message to each of the users of the community from which the source message is received.

20. The apparatus according to claim 17,
wherein said extraction result editing unit correspondingly stores the extraction result information and the contents of editing in said extraction result memory.

21. The apparatus according to claim 17,
when the one of the users creates an editing message including the contents of editing as a reply of a source message originally including the extraction result information,
wherein said extraction result editing unit changes the extraction result information of the source message by referring to the contents of the editing.

22. A method for extracting and sharing information, comprising:
receiving a plurality of messages from a plurality of users in a community in which the plurality of users participate;
storing the plurality of messages received in a message memory;
extracting information from the plurality of messages stored in the message memory by referring to a plurality of extraction rides stored in an extraction rule memory, each extraction rule including an extraction pattern, an extraction target and a display format, an extraction result information being generated in correspondence with each extraction rule;
storing the extraction result information in an extraction result memory;
editing the extraction result information stored in the extraction result memory;
generating an editing message representing editing of the extraction result information;
wherein information of the message memory, the extraction rule memory, and the extraction result memory are shared by the plurality of users in the community; and
storing user data, community data, belonging relation data and message data in a community management information memory,
wherein the user data includes at least a user identifier and a user name, the community data includes at least a community identifier, a community name and a type, the belonging relation data includes at least a belonging relation between the user identifier and the community identifier and a distribution method, the message data includes at least a message identifier, the user identifier of the one of the users who created a first message of the plurality of messages, a parent message identifier of another message to which the first message is replied.

23. A computer program product stored on a computer storage medium, comprising:

a computer readable program code embodied in said product for causing a computer to extract and share information, said computer readable program code having:

a first program code to receive a plurality of messages a plurality of users in a community in which the plurality of users participate;

a second program code to store the plurality of messages received in a message memory;

a third program code to extract information from the plurality of messages stored in the message memory by referring to a plurality of extraction rules stored in an extraction rule memory, each extraction rule including an extraction pattern, an extraction target and a display format, an extraction result information being generated in correspondence with each extraction rule:

a fourth program code to store the extraction result information in an extraction result memory;

a fifth program code to edit the extraction result information stored in the extraction result memory; and a sixth program code to generate an editing message representing editing of the extraction result information;

wherein information of the message memory, the extraction rule memory, and the extraction result memory are shared by the plurality of users in the community; and a seventh program code to store user data, community data, belonging relation data and message data in a community management information memory, wherein the user data includes at least a user identifier and a user name, the community data includes at least a community identifier, a community name and a type, the belonging relation data includes at least a belonging relation between the user identifier and the community identifier and a distribution method, the message data includes at least a message identifier, the user identifier of the one of the users who created a first message of the plurality of messages, a parent message identifier of another message to which the first message is replied.

* * * * *